US012134732B2

(12) United States Patent
Boul et al.

(10) Patent No.: US 12,134,732 B2
(45) Date of Patent: Nov. 5, 2024

(54) FLUID LOSS CONTROL ADDITIVE

(71) Applicant: Saudi Arabian Oil Company, Dhahran (SA)

(72) Inventors: Peter Boul, Houston, TX (US); Kenneth Dejuan Johnson, Houston, TX (US)

(73) Assignee: Saudi Arabian Oil Company, Dhahran (SA)

(*) Notice: Subject to any disclaimer, the term of this patent is extended or adjusted under 35 U.S.C. 154(b) by 259 days.

(21) Appl. No.: 17/643,252

(22) Filed: Dec. 8, 2021

(65) Prior Publication Data

US 2023/0174844 A1  Jun. 8, 2023

(51) Int. Cl.
| | | |
|---|---|---|
| *C09K 8/487* | (2006.01) | |
| *C04B 14/30* | (2006.01) | |
| *C04B 24/00* | (2006.01) | |
| *C04B 24/16* | (2006.01) | |
| *C04B 24/26* | (2006.01) | |
| *C04B 24/34* | (2006.01) | |
| *C04B 28/08* | (2006.01) | |
| *C09K 8/514* | (2006.01) | |
| *C04B 103/00* | (2006.01) | |
| *C04B 103/32* | (2006.01) | |
| *C04B 103/46* | (2006.01) | |
| *C04B 103/50* | (2006.01) | |

(52) U.S. Cl.
CPC .............. *C09K 8/487* (2013.01); *C04B 14/30* (2013.01); *C04B 24/003* (2013.01); *C04B 24/163* (2013.01); *C04B 24/2647* (2013.01); *C04B 24/34* (2013.01); *C04B 28/08* (2013.01); *C09K 8/514* (2013.01); *C04B 2103/0035* (2013.01); *C04B 2103/0059* (2013.01); *C04B 2103/32* (2013.01); *C04B 2103/46* (2013.01); *C04B 2103/50* (2013.01)

(58) Field of Classification Search
CPC ........ C09K 8/487; C09K 8/514; C09K 8/508; C04B 14/30; C04B 24/003; C04B 24/163; C04B 24/2647; C04B 24/34; C04B 28/08; C04B 2103/0035; C04B 2103/0059; C04B 2103/32; C04B 2103/46; C04B 2103/50; C04B 28/04; C04B 40/0039
See application file for complete search history.

(56) References Cited

U.S. PATENT DOCUMENTS

| | | | |
|---|---|---|---|
| 2,705,050 A | 3/1955 | Davis et al. | |
| 3,887,009 A | 6/1975 | Miller et al. | |
| 4,883,126 A | 11/1989 | Leland | |
| 6,085,840 A * | 7/2000 | Laramay | C04B 24/2652 |
| | | | 106/725 |
| 6,089,318 A | 7/2000 | Laramay et al. | |
| 7,523,784 B2 | 4/2009 | Lewis et al. | |
| 8,124,569 B2 | 2/2012 | Khan et al. | |
| 2021/0087459 A1* | 3/2021 | Patil | E21B 43/13 |

FOREIGN PATENT DOCUMENTS

| | | | | |
|---|---|---|---|---|
| CN | 105567198 A | * | 5/2016 | |
| CN | 110591667 A | * | 12/2019 | ............... C08F 2/44 |

OTHER PUBLICATIONS

Arbad et al., "A Review of Recent Research on Contamination of Oil Well Cement with Oil-Based Drilling Fluid and the Need of New and Accurate Correlations" ChemEngineering, Apr. 2020, 20 pages.
Brichni et al., "Optimisation of Magnesium Oxychloride Cement Properties by Silica Glass" Adv. Cem. Res. 28 (10), Jul. 2016, 654-663, 10 pages.
Ladva et al., "The Cement-to-Formation Interface in Zonal Isolation" Proc. IADC/SPE Asia Pacific Drill. Technol. Conf. Exhib., Sep. 2004, 369-382, 14 pages.
Li et al., "Contamination of Cement Slurries with Diesel-Based Drilling Fluids in a Shale Gas Well" J. Nat. Gas Sci. Eng., Aug. 27, 2015, 1312-1320, 9 pages.
Nelson et al., "Well Cementing" 2nd ed., Sugar Land, Schlumberger, 2006, 799 pages.

* cited by examiner

*Primary Examiner* — Kumar R Bhushan
(74) *Attorney, Agent, or Firm* — Fish & Richardson P.C.

(57) ABSTRACT

Fluid loss control additives for a cement slurry are provided. An exemplary fluid loss control additive includes a copolymer containing 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units.

28 Claims, 3 Drawing Sheets

Mix Water, Cement, Copolymer, and Graft Copolymer ⸺102

100
FIGURE 1

Provide Slurry to Oil Well ⸺202

200
FIGURE 2

FLUID LOSS CONTROL ADDITIVE

TECHNICAL FIELD

The present disclosure is directed to controlling fluid loss of a cement-containing slurry.

BACKGROUND

During the primary well cementing process, a cement slurry is placed in the annulus between the rock formations of the wellbore and the steel casing in order to provide an impermeable seal and achieve zonal isolation. Complete and durable zonal isolation, or preventing the flow of fluids between zones in the well, is the foremost goal of cementing. The quality of the cement work has a direct impact on the economic longevity of the well throughout the life of producing oil and gas and the efficacy of the primary cementing operation is governed by the well production and performance over the life of the well. It is estimated that about 15% of primary cementing jobs fail, costing the petroleum industry over USD 450 million annually in the repairing of the cement sheath through a process of cement squeezing.

Previous efforts to avoid failure by changing the composition of the cement slurry, such as using additives to improve the curing behavior of a cement, are often unable to overcome failure in the oil well cement sheath, which can be exacerbated by drilling fluids and filter cake residues left behind after drilling operations. Previous attempts to convert drilling fluids to a cement-containing "settable fluid" have been limited in some cases by gelation behavior, and in some cases have provided set compositions that are incompatible with the steel casing and aqueous conditions of the annulus.

Thus, there is a need for additives for improving the properties of cement slurries, such as cement slurries used in a well cementing process.

SUMMARY

An embodiment of the present disclosure provides a fluid loss control additive including a copolymer containing 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units.

An embodiment of the present disclosure provides a slurry containing water, a cement, a copolymer of 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units. In an aspect of the slurry, the side-chain polymer contains acryloylmorpholine monomer units and 2-acrylamido-2-methylpropane sulfonic acid monomer units.

An embodiment of the present disclosure provides a method of controlling fluid loss of a cement slurry. The method includes mixing, in any order, water, a cement, a copolymer containing 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units.

BRIEF DESCRIPTION OF DRAWINGS

FIG. 1 is a process flow diagram of a method of controlling fluid loss of a cement slurry.

FIG. 2 is a process flow diagram of a method of cementing an oil well.

DETAILED DESCRIPTION

Figure 3:
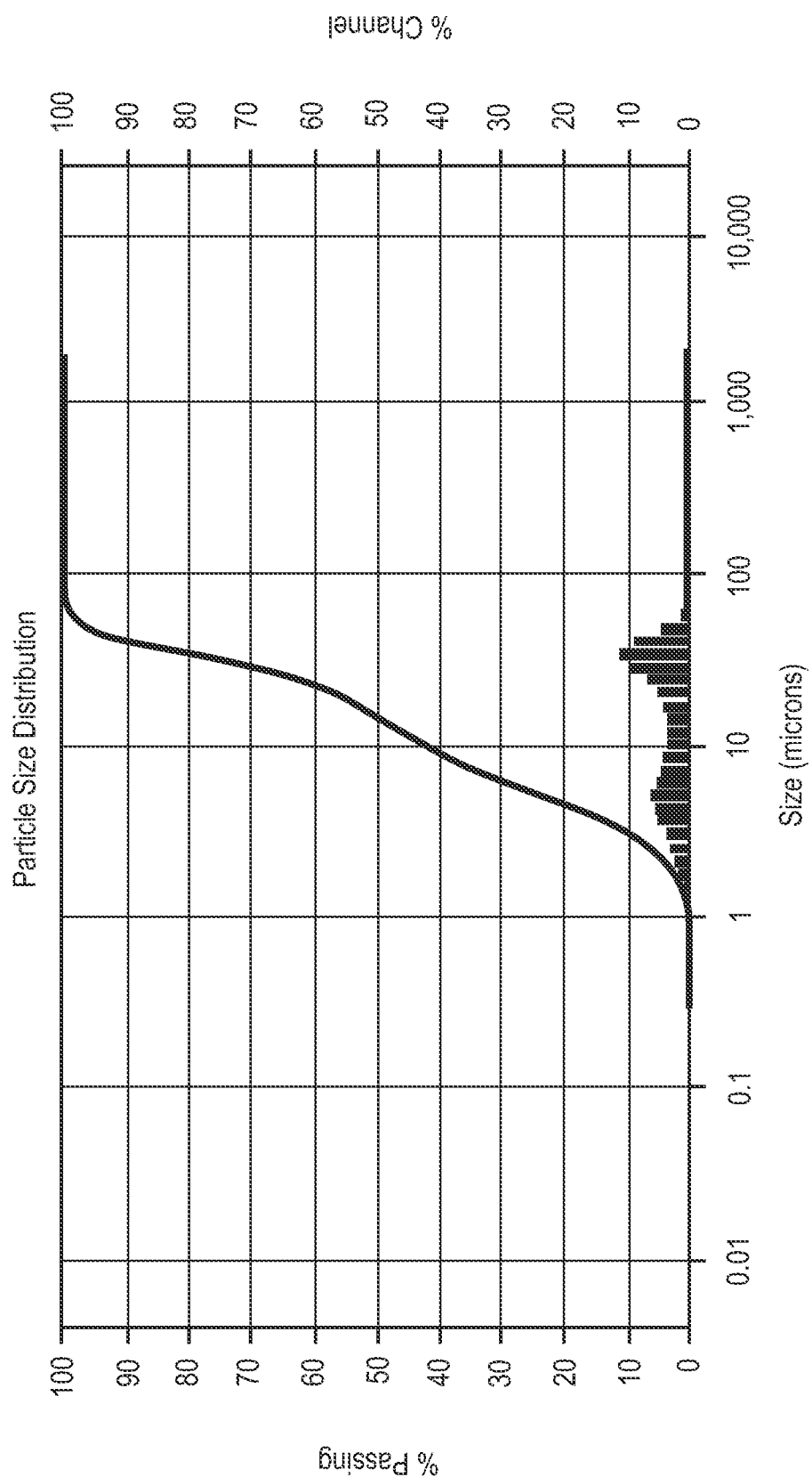
FIG. 3 is a graph showing the particle size distribution of a cement including Portland cement and slag cement.

The present disclosure relates to fluid loss control additives for a cement slurry, to methods for controlling fluid loss of a cement slurry with the additives, to slurries containing the additives, and to methods for cementing an oil well with the slurries. In some embodiments, the additives of the present disclosure control fluid loss from a cement slurry. In some embodiments, cement slurries including the additives of the present disclosure are useful in a well cementing process. In some embodiments, cement slurries including the additives of the present disclosure are useful as settable drilling fluids.

Provided in the present disclosure are fluid loss control additives containing a copolymer and a graft copolymer. The copolymer contains 2-acrylamido-2-methylpropane sulfonic acid monomer units and acryloylmorpholine monomer units. The graft copolymer contains a humate and, grafted onto the humate, a side-chain polymer comprising at least one of acrylamide monomer units, acryloylmorpholine monomer units, acrylic acid monomer units, and 2-acrylamido-2-methylpropane sulfonic acid monomer units.

Fluid Loss Control Additives

Provided in this disclosure are fluid loss control additives containing a copolymer containing 2-acrylamido-2-methylpropane sulfonic acid monomer units and acryloylmorpholine monomer units, and a graft copolymer. The graft copolymer contains a side-chain polymer including at least one, for example, one, two, three or four, of acrylamide monomer units, acryloylmorpholine monomer units, acrylic acid monomer units, and 2-acrylamido-2-methylpropane sulfonic acid monomer units, grafted onto humate.

In some embodiments, the 2-acrylamido-2-methylpropane sulfonic acid monomer units make up about 10% to about 90%, such as about 10% to about 80%, or about 10% to about 70%, or about 10% to about 60%, or about 20% to about 90%, or about 20% to about 80%, or about 20% to about 70%, or about 20% to about 60%, or about 30% to about 90%, or about 30% to about 80%, or about 30% to about 70%, or about 30% to about 60%, or about 40% to about 90%, or about 40% to about 80%, or about 40% to about 70%, or about 40% to about 60%, or about 50% to about 90%, or about 50% to about 80%, or about 50% to about 70%, or about 50% to about 60% of the total number of monomer units of the copolymer. For example, the 2-acrylamido methylpropane sulfonic acid monomer units make up about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 90% of the total number of monomer units of the copolymer.

In some embodiments, the acryloylmorpholine monomer units make up about 10% to about 90%, such as about 10% to about 80%, or about 10% to about 70%, or about 10% to about 60%, or about 20% to about 90%, or about 20% to about 80%, or about 20% to about 70%, or about 20% to about 60%, or about 30% to about 90%, or about 30% to about 80%, or about 30% to about 70%, or about 30% to about 60%, or about 40% to about 90%, or about 40% to about 80%, or about 40% to about 70%, or about 40% to about 60%, or about 50% to about 90%, or about 50% to about 80%, or about 50% to about 70%, or about 50% to about 60% of the total number of monomer units of the copolymer. For example, the acryloylmorpholine monomer units make up about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 90% of the total number of monomer units of the copolymer.

In some embodiments, the 2-acrylamido-2-methylpropane sulfonic acid monomer units make up about 30% to about 90%, or about 30% to about 80%, or about 30% to about 70%, or about 40% to about 90%, or about 40% to about 80%, or about 40% to about 70%, or about 50% to about 90%, or about 50% to about 80%, or about 50% to about 60% of the total number of monomer units of the copolymer, and the acryloylmorpholine monomer units make up about 10% to about 60%, or about 10% to about 50%, or about 10% to about 40%, or about 20% to about 60%, or about 20% to about 50%, or about 20% to about 40%, or about 30% to about 60%, or about 30% to about 50%, or about 30% to about 40% of the total number of monomer units of the copolymer.

In some embodiments, the acrylamide monomer units make up about 5% to about 85%, such as about 5% to about 80%, or about 5% to about 70%, or about 5% to about 60%, or about 5% to about 50%, or about 10% to about 85%, or about 10% to about 80%, or about 10% to about 70%, or about 10% to about 60%, or about 10% to about 50%, or about 20% to about 85%, or about 20% to about 80%, or about 20% to about 70%, or about 20% to about 60%, or about 20% to about 50%, or about 30% to about 85%, or about 30% to about 80%, or about 30% to about 70%, or about 30% to about 60%, or about 30% to about 50%, or about 40% to about 85%, or about 40% to about 80%, or about 40% to about 70%, or about 40% to about 60%, or about 40% to about 50% of the total number of monomer units of the side-chain polymer. For example, the acrylamide monomer units make up about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85% of the total number of the monomer units of the side-chain polymer.

In some embodiments, the acryloylmorpholine monomer units make up about 5% to about 85%, such as about 5% to about 80%, or about 5% to about 70%, or about 5% to about 60%, or about 5% to about 50%, or about 10% to about 85%, or about 10% to about 80%, or about 10% to about 70%, or about 10% to about 60%, or about 10% to about 50%, or about 20% to about 85%, or about 20% to about 80%, or about 20% to about 70%, or about 20% to about 60%, or about 20% to about 50%, or about 30% to about 85%, or about 30% to about 80%, or about 30% to about 70%, or about 30% to about 60%, or about 30% to about 50%, or about 40% to about 85%, or about 40% to about 80%, or about 40% to about 70%, or about 40% to about 60%, or about 40% to about 50% of the total number of monomer units of the side-chain polymer. For example, the acryloylmorpholine monomer units make up about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85% of the total number of the monomer units of the side-chain polymer.

In some embodiments, the acrylic acid monomer units make up about 5% to about 85%, such as about 5% to about 80%, or about 5% to about 70%, or about 5% to about 60%, or about 5% to about 50%, or about 10% to about 85%, or about 10% to about 80%, or about 10% to about 70%, or about 10% to about 60%, or about 10% to about 50%, or about 20% to about 85%, or about 20% to about 80%, or about 20% to about 70%, or about 20% to about 60%, or about 20% to about 50%, or about 30% to about 85%, or about 30% to about 80%, or about 30% to about 70%, or about 30% to about 60%, or about 30% to about 50%, or about 40% to about 85%, or about 40% to about 80%, or about 40% to about 70%, or about 40% to about 60%, or about 40% to about 50% of the total number of monomer units of the side-chain polymer. For example, the acrylic acid monomer units make up about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85% of the total number of the monomer units of the side-chain polymer.

In some embodiments, the 2-acrylamido-2-methylpropane sulfonic acid monomer units make up about 5% to about 85%, such as about 5% to about 80%, or about 5% to about 70%, or about 5% to about 60%, or about 5% to about 50%, or about 10% to about 85%, or about 10% to about 80%, or about 10% to about 70%, or about 10% to about 60%, or about 10% to about 50%, or about 20% to about 85%, or about 20% to about 80%, or about 20% to about 70%, or about 20% to about 60%, or about 20% to about 50%, or about 30% to about 85%, or about 30% to about 80%, or about 30% to about 70%, or about 30% to about 60%, or about 30% to about 50%, or about 40% to about 85%, or about 40% to about 80%, or about 40% to about 70%, or about 40% to about 60%, or about 40% to about 50% of the total number of monomer units of the side-chain polymer. For example, the 2-acrylamino-2-methylpropane sulfonic acid monomer units make up about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85% of the total number of the monomer units of the side-chain polymer.

In some embodiments, the acryloylmorpholine monomer units make up about 2.5% to about 45%, or about 2.5% to about 35%, or about 2.5% to about 25%, or about 5% to about 45%, or about 5% to about 35%, or about 5% to about 25%, or about 10% to about 45%, or about 10% to about 35%, or about 10% to about 25% of the total number of monomer units of the side-chain polymer, and the 2-acrylamido-2-methylpropane sulfonic acid monomer units make up about 10% to about 85%, or about 10% to about 75%, or about 10% to about 60%, or about 20% to about 85%, or about 20% to about 75%, or about 20% to about 60%, or about 30% to about 85%, or about 30% to about 75%, or about 30% to about 60% of the total number of monomer units of the side-chain polymer. The side-chain polymer can further include acrylamide monomer units making up, for example, about 5% to about 50%, or about 10% to about 40% of the total number of monomer units of the side-chain polymer, and acrylic acid monomer units making up, for example, about 5% to about 50%, or about 10% to about 50% of the total number of monomer units of the side-chain polymer.

In some embodiments, the humate contains about 1 wt % to about 20 wt %, such as about 1 wt % to about 17.5 wt %, or about 1 wt % to about 15 wt %, or about 1 wt % to about 12.5 wt %, or about 2.5 wt % to about 20 wt %, or about 2.5 wt % to about 17.5 wt %, or about 2.5 wt % to about 15 wt %, or about 2.5 wt % to about 12.5 wt %, or about 5 wt % to about 20 wt %, or about 5 wt % to about 17.5 wt %, or about 5 wt % to about 15 wt %, or about 5 wt % to about 12.5 wt %, or about 7.5 wt % to about 20 wt %, or about 7.5 wt % to about 17.5 wt %, or about 7.5 wt % to about 15 wt %, or about 7.5 wt % to about 12.5 wt %, or about 10 wt % to about 20 wt %, or about 10 wt % to about 17.5 wt %, or about 10 wt % to about 15 wt %, or about 10 wt % to about 12.5 wt % of the graft copolymer. For example, the humate contains about 1 wt %, or about 2.5 wt %, or about 5 wt %, or about 7.5 wt %, or about 10 wt %, or about 12.5 wt %, or about 15 wt %, or about 17.5 wt %, or about 20 wt % of the graft copolymer.

In some embodiments, the copolymer and the graft copolymer are present in the additive in a weight ratio of about 100:1 to about 1:100, such as about 100:1 to about 1:80, or about 100:1 to about 1:60, or about 100:1 to about 1:40, or about 100:1 to about 1:40, or about 100:1 to about 1:20, or about 100:1 to about 1:10, or about 100:1 to about 1:4, or about 100:1 to about 1:2, or about 80:1 to about 1:100, or about 80:1 to about 1:80, or about 80:1 to about 1:60, or about 80:1 to about 1:40, or about 80:1 to about 1:20, or about 80:1 to about 1:10, or about 80:1 to about 1:4, or about 80:1 to about 1:2, or about 60:1 to about 1:100, or about 60:1 to about 1:80, or about 60:1 to about 1:60, or about 60:1 to about 1:40, or about 60:1 to about 1:20, or about 60:1 to about 1:10, or about 60:1 to about 1:4, or about 60:1 to about 1:2, or about 40:1 to about 1:100, or about 40:1 to about 1:80, or about 40:1 to about 1:60, or about 40:1 to about 1:40, or about 40:1 to about 1:20, or about 40:1 to about 1:10, or about 40:1 to about 1:4, or about 40:1 to about 1:2, or about 20:1 to about 1:100, or about 20:1 to about 1:80, or about 20:1 to about 1:60, or about 20:1 to about 1:40, or about 20:1 to about 1:20, or about 20:1 to about 1:10, or about 20:1 to about 1:4, or about 20:1 to about 1:2, or about 10:1 to about 1:100, or about 10:1 to about 1:80, or about 10:1 to about 1:60, or about 10:1 to about 1:40, or about 10:1 to about 1:20, or about 10:1 to about 1:10, or about 10:1 to about 1:4, or about 10:1 to about 1:2, or about 4:1 to about 1:100, or about 4:1 to about 1:80, or about 4:1 to about 1:60, or about 4:1 to about 1:40, or about 4:1 to about 1:20, or about 4:1 to about 1:10, or about 4:1 to about 1:4, or about 4:1 to about 1:2, or about 2:1 to about 1:100, or about 2:1 to about 1:80, or about 2:1 to about 1:60, or about 2:1 to about 1:40, or about 2:1 to about 1:20, or about 2:1 to about 1:10, or about 2:1 to about 1:4, or about 2:1 to about 1:2. For example, the copolymer and the graft copolymer are present in the additive in a weight ratio of about 100:1, or about 90:1, or about 80:1, or about 70:1, or about 60:1, or about 50:1, or about 40:1, or about 30:1, or about 20:1, or about 10:1, or about 8:1, or about 6:1, or about 4:1, or about 2:1, or about 1:1, or about 1:2, or about 1:4, or about 1:6, or about 1:8, or about 1:10, or about 1:20, or about 1:30, or about 1:40, or about 1:50, or about 1:60, or about 1:70, or about 1:80, or about 1:90, or about 1:100.

In some embodiments, the fluid loss control additive contains about 1 wt % to about 99 wt %, such as about 1 wt % to about 95 wt %, or about 1 wt % to about 90 wt %, or about 1 wt % to about 80 wt %, or about 1 wt % to about 70 wt %, or about 1 wt % to about 60 wt %, or about 5 wt % to about 99 wt %, or about 5 wt % to about 95 wt %, or about 5 wt % to about 90 wt %, or about 5 wt % to about 80 wt %, or about 5 wt % to about 70 wt %, or about 5 wt % to about 60 wt %, or about 10 wt % to about 99 wt %, or about 10 wt % to about 95 wt %, or about 10 wt % to about 90 wt %, or about 10 wt % to about 80 wt %, or about 10 wt % to about 70 wt %, or about 10 wt % to about 60 wt %, or about 20 wt % to about 99 wt %, or about 20 wt % to about 95 wt %, or about 20 wt % to about 90 wt %, or about 20 wt % to about 80 wt %, or about 20 wt % to about 70 wt %, or about 20 wt % to about 60 wt %, or about 30 wt % to about 99 wt %, or about 30 wt % to about 95 wt %, or about 30 wt % to about 90 wt %, or about 30 wt % to about 80 wt %, or about 30 wt % to about 70 wt %, or about 30 wt % to about 60 wt %, or about 40 wt % to about 99 wt %, or about 40 wt % to about 95 wt %, or about 40 wt % to about 90 wt %, or about 40 wt % to about 80 wt %, or about 40 wt % to about 70 wt %, or about 40 wt % to about 60 wt %, or about 50 wt % to about 99 wt %, or about 50 wt % to about 95 wt %, or about 50 wt % to about 90 wt %, or about 50 wt % to about 80 wt %, or about 50 wt % to about 70 wt %, or about 50 wt % to about 60 wt % of the copolymer. For example, the fluid loss control additive contains about 1 wt %, or about 5 wt %, or about 10 wt %, or about 15 wt %, or about 20 wt %, or about 25 wt %, or about 30 wt %, or about 35 wt %, or about 40 wt %, or about 45 wt %, or about 50 wt %, or about 55 wt %, or about 60 wt %, or about 65 wt %, or about 70 wt %, or about 75 wt %, or about 80 wt %, or about 85 wt %, or about 90 wt %, or about 95 wt %, or about 99 wt % of the copolymer.

In some embodiments, the fluid loss control additive contains about 1 wt % to about 99 wt %, such as about 1 wt % to about 95 wt %, or about 1 wt % to about 90 wt %, or about 1 wt % to about 80 wt %, or about 1 wt % to about 70 wt %, or about 1 wt % to about 60 wt %, or about 5 wt % to about 99 wt %, or about 5 wt % to about 95 wt %, or about 5 wt % to about 90 wt %, or about 5 wt % to about 80 wt %, or about 5 wt % to about 70 wt %, or about 5 wt % to about 60 wt %, or about 10 wt % to about 99 wt %, or about 10 wt % to about 95 wt %, or about 10 wt % to about 90 wt %, or about 10 wt % to about 80 wt %, or about 10 wt % to about 70 wt %, or about 10 wt % to about 60 wt %, or about 20 wt % to about 99 wt %, or about 20 wt % to about 95 wt %, or about 20 wt % to about 90 wt %, or about 20 wt % to about 80 wt %, or about 20 wt % to about 70 wt %, or about 20 wt % to about 60 wt %, or about 30 wt % to about 99 wt %, or about 30 wt % to about 95 wt %, or about 30 wt % to about 90 wt %, or about 30 wt % to about 80 wt %, or about 30 wt % to about 70 wt %, or about 30 wt % to about 60 wt %, or about 40 wt % to about 99 wt %, or about 40 wt % to about 95 wt %, or about 40 wt % to about 90 wt %, or about 40 wt % to about 80 wt %, or about 40 wt % to about 70 wt %, or about 40 wt % to about 60 wt %, or about 50 wt % to about 99 wt %, or about 50 wt % to about 95 wt %, or about 50 wt % to about 90 wt %, or about 50 wt % to about 80 wt %, or about 50 wt % to about 70 wt %, or about 50 wt % to about 60 wt % of the graft copolymer. For example, the fluid loss control additive contains about 1 wt %, or about 5 wt %, or about 10 wt %, or about 15 wt %, or about 20 wt %, or about 25 wt %, or about 30 wt %, or about 35 wt %, or about 40 wt %, or about 45 wt %, or about 50 wt %, or about 55 wt %, or about 60 wt %, or about 65 wt %, or about 70 wt %, or about 75 wt %, or about 80 wt %, or about 85 wt %, or about 90 wt %, or about 95 wt %, or about 99 wt % of the graft copolymer.

In some embodiments, the fluid loss control additive contains about 10 wt % to about 90 wt %, or about 10 wt % to about 80 wt %, or about 10 wt % to about 70 wt %, or about 20 wt % to about 90 wt %, or about 20 wt % to about 80 wt %, or about 20 wt % to about 70 wt %, or about 30 wt % to about 90 wt %, or about 30 wt % to about 80 wt %, or about 30 wt % to about 70 wt % of the copolymer, and about 10 wt % to about 90 wt %, or about 10 wt % to about 80 wt %, or about 10 wt % to about 70 wt %, or about 20 wt % to about 90 wt %, or about 20 wt % to about 80 wt %, or about 20 wt % to about 70 wt %, or about 30 wt % to about 90 wt %, or about 30 wt % to about 80 wt %, or about 30 wt % to about 70 wt % of the graft copolymer.

In some embodiments, the copolymer and the graft copolymer are present in a combined amount of at least about 80 wt % of the additive, for example at least about 85 wt %, or at least about 90 wt %, or at least about 95 wt %, or at least about 97.5 wt %, or at least about 98 wt %, or at least about 98.5 wt %, or at least about 99 wt %, or at least about 99.5 wt %, or at least about 99.9 wt % of the additive.

Slurries

Also provided in this disclosure are slurries containing a fluid loss control additive of the present disclosure. In some embodiments, the slurry contains water, a cement, a copolymer of 2-acrylamido-2-methylpropane sulfonic acid monomer units and acryloylmorpholine monomer units, and a graft copolymer containing a humate and, grafted onto the humate, a side-chain polymer including at least one of acrylamide monomer units, acryloylmorpholine monomer units, acrylic acid monomer units, and 2-acrylamido-2-methylpropane sulfonic acid monomer units. In some embodiments of the slurry, the copolymer is any copolymer of the present disclosure. In some embodiments of the slurry, the graft copolymer is any graft copolymer of the present disclosure, for example, containing a side-chain polymer including acryloylmorpholine monomer units and 2-acrylamido-2-methylpropane sulfonic acid monomer units.

In some embodiments of the slurry, the cement contains a Portland cement, for example at least about 40 wt %, or at least about 50 wt %, or at least about 60 wt %, or at least about 70 wt %, or at least about 80 wt %, or at least about 90 wt %, or at least about 95 wt %, or at least about 97.5 wt %, or at least about 99 wt % of a Portland cement. In other examples, the cement contains about 40 wt % to about 100 wt %, or about 40 wt % to about 90 wt %, or about 40 wt % to about 80 wt %, or about 40 wt % to about 70 wt %, or about 50 wt % to about 100 wt %, or about 50 wt % to about 90 wt %, or about 50 wt % to about 80 wt %, or about 50 wt % to about 70 wt %, or about 60 wt % to about 100 wt %, or about 60 wt % to about 90 wt %, or about 60 wt % to about 80 wt %, or about 60 wt % to about 70 wt %, or about 40 wt %, or about 45 wt %, or about 50 wt %, or about 55 wt %, or about 60 wt %, or about 65 wt %, or about 70 wt %, or about 75 wt %, or about 80 wt %, or about 85 wt %, or about 90 wt %, or about 95 wt %, or about 100 wt % of a Portland cement.

In some embodiments of the slurry, the cement contains a slag cement, for example, about 10 wt % to about 50 wt %, or about 10 wt % to about 40 wt %, or about 20 wt % to about 50 wt %, or about 20 wt % to about 40 wt %, or about 30 wt % to about 50 wt %, or about 30 wt % to about 40 wt %, or about 10 wt %, or about 15 wt %, or about 20 wt %, or about 25 wt %, or about 30 wt %, or about 35 wt %, or about 40 wt %, or about 45 wt %, or about 50 wt % of a slag cement.

In some embodiments of the slurry, the cement contains about 40 wt % to about 100 wt %, or about 40 wt % to about 90 wt %, or about 40 wt % to about 80 wt %, or about 40 wt % to about 70 wt %, or about 50 wt % to about 100 wt %, or about 50 wt % to about 90 wt %, or about 50 wt % to about 80 wt %, or about 50 wt % to about 70 wt %, or about 60 wt % to about 100 wt %, or about 60 wt % to about 90 wt %, or about 60 wt % to about 80 wt %, or about 60 wt % to about 70 wt % of a Portland cement, and about 10 wt % to about 50 wt %, or about 10 wt % to about 40 wt %, or about 20 wt % to about 50 wt %, or about 20 wt % to about 40 wt %, or about 30 wt % to about 50 wt %, or about 30 wt % to about 40 wt % of a slag cement.

In some embodiments, the weight of the copolymer present in the slurry is about 0.05% to about 10%, such as about 0.05% to about 7.5%, or about 0.05% to about 5%, or about 0.05% to about 2.5%, or about 0.05% to about 1.5%, or about 0.1% to about 10%, or about 0.1% to about 7.5%, or about 0.1% to about 5%, or about 0.1% to about 2.5%, or about 0.1% to about 1.5%, or about 0.25% to about 10%, or about 0.25% to about 7.5%, or about 0.25% to about 5%, or about 0.25% to about 2.5%, or about 0.25% to about 1.5%, or about 0.5% to about 10%, or about 0.5% to about 7.5%, or about 0.5% to about 5%, or about 0.5% to about 2.5%, or about 0.5% to about 1.5%, or about 1% to about 10%, or about 1% to about 7.5%, or about 1% to about 5%, or about 1% to about 2.5%, or about 1% to about 1.5% of the weight of the cement present in the slurry. For example, the weight of the copolymer present in the slurry is about 0.1 wt %, or about 0.25 wt %, or about 0.5 wt %, or about 0.75 wt %, or about 1 wt %, or about 1.25 wt %, or about 1.5 wt %, or about 1.75 wt %, or about 2 wt %, or about 2.5 wt %, or about 3 wt %, or about 3.5 wt %, or about 4 wt %, or about 4.5 wt %, or about 5 wt % of the weight of the cement present in the slurry.

In some embodiments, the weight of the graft copolymer present in the slurry is about 0.05% to about 10%, such as about 0.05% to about 7.5%, or about 0.05% to about 5%, or about 0.05% to about 2.5%, or about 0.05% to about 1.5%, or about 0.1% to about 10%, or about 0.1% to about 7.5%, or about 0.1% to about 5%, or about 0.1% to about 2.5%, or about 0.1% to about 1.5%, or about 0.25% to about 10%, or about 0.25% to about 7.5%, or about 0.25% to about 5%, or about 0.25% to about 2.5%, or about 0.25% to about 1.5%, or about 0.5% to about 10%, or about 0.5% to about 7.5%, or about 0.5% to about 5%, or about 0.5% to about 2.5%, or about 0.5% to about 1.5%, or about 1% to about 10%, or about 1% to about 7.5%, or about 1% to about 5%, or about 1% to about 2.5%, or about 1% to about 1.5% of the weight of the cement present in the slurry. For example, the weight of the graft copolymer present in the slurry is about 0.1 wt %, or about 0.25 wt %, or about 0.5 wt %, or about 0.75 wt %, or about 1 wt %, or about 1.25 wt %, or about 1.5 wt %, or about 1.75 wt %, or about 2 wt %, or about 2.5 wt %, or about 3 wt %, or about 3.5 wt %, or about 4 wt %, or about 4.5 wt %, or about 5 wt % of the weight of the cement present in the slurry.

In some embodiments, the slurry further contains an American Petroleum Institute (API) Class G cement, for example, a weight of API Class G cement that is about 0.1% to about 35%, or about 0.1% to about 20%, or about 0.1% to about 10%, or about 0.1% to about 5%, or about 0.5% to about 35%, or about 0.5% to about 20%, or about 0.5% to about 10%, or about 0.5% to about 5%, or about 1% to about 35%, or about 1% to about 20%, or about 1% to about 10%, or about 1% to about 5%, or about 2% to about 35%, or about 2% to about 20%, or about 2% to about 10%, or about 2% to about 5% of the weight of the cement present in the slurry. For example, the weight of API Class G cement present in the slurry is about 0.5%, or about 1%, or about 2%, or about 3%, or about 4%, or about 5%, or about 6%, or about 7%, or about 8%, or about 9%, or about 10% of a weight of the cement present in the slurry. In some examples, the cement contains a Portland cement, or a Portland cement and a slag cement, and the slurry further contains a weight of API Class G cement that is about 0.1% to about 35%, or about 0.5% to about 10% of a weight of the cement present in the slurry.

In some embodiments, the slurry further contains a retarder, for example, a weight of retarder that is about 0.1% to about 35%, or about 0.1% to about 20%, or about 0.1% to about 10%, or about 0.1% to about 5%, or about 0.5% to about 35%, or about 0.5% to about 20%, or about 0.5% to about 10%, or about 0.5% to about 5%, or about 0.75% to about 35%, or about 0.75% to about 20%, or about 0.75% to about 10%, or about 0.75% to about 5%, or about 1.5% to about 35%, or about 1.5% to about 20%, or about 1.5% to about 10%, or about 1.5% to about 5% of the weight of the cement present in the slurry. For example, the weight of the retarder present in the slurry is about 0.1%, or about 0.2%, or about 0.3%, or about 0.4%, or about 0.5%, or about 0.6%, or about 0.7%, or about 0.8%, or about 0.9%, or about 1%, or about 1.1%, or about 1.2%, or about 1.3%, or about 1.4%, or about 1.5%, or about 1.6%, or about 1.7%, or about 1.8%, or about 1.9%, or about 2%, or about 2.5%, or about 3%, or about 3.5%, or about 4%, or about 4.5%, or about 5% of the weight of the cement present in the slurry.

In some embodiments of the slurry, the retarder includes zinc oxide, for example, a weight of zinc oxide that is about 0.1% to about 1%, or about 0.1% to about 0.8%, or about 0.1% to about 0.6%, or about 0.1% to about 0.5%, or about 0.2% to about 1%, or about 0.8%, or about 0.2% to about 0.6%, or about 0.2% to about 0.5%, or about 0.3% to about 1%, or about 0.3% to about 0.8%, or about 0.3% to about 0.6%, or about 0.3% to about 0.5% of the weight of the cement present in the slurry.

In some embodiments of the slurry, the retarder includes diethylenetriamine penta(methylene phosphonic acid), for example, a weight of diethylenetriamine penta(methylene phosphonic acid) that is about 0.1% to about 1%, or about 0.1% to about 0.8%, or about 0.1% to about 0.6%, or about 0.1% to about 0.5%, or about 0.2% to about 1%, or about 0.8%, or about 0.2% to about 0.6%, or about 0.2% to about 0.5%, or about 0.3% to about 1%, or about 0.3% to about 0.8%, or about 0.3% to about 0.6%, or about 0.3% to about 0.5% of the weight of the cement present in the slurry.

In some embodiments of the slurry, the retarder includes the second copolymer containing 2-acrylamido-2-methyl-propane sulfonic acid monomer units and acrylic acid monomer units, for example, a weight of the second copolymer that is about 0.1% to about 1%, or about 0.1% to about 0.8%, or about 0.1% to about 0.6%, or about 0.1% to about 0.5%, or about 0.2% to about 1%, or about 0.8%, or about 0.2% to about 0.6%, or about 0.2% to about 0.5%, or about 0.3% to about 1%, or about 0.3% to about 0.8%, or about 0.3% to about 0.6%, or about 0.3% to about 0.5% of the weight of the cement present in the slurry.

For example, the weight of the zinc oxide, the diethylenetriamine penta(methylene phosphonic acid), and the second copolymer can each independently be about 0.1% to about 1%, or about 0.1% to about 0.8%, or about 0.1% to about 0.6%, or about 0.1% to about 0.5%, or about 0.2% to about 1%, or about 0.8%, or about 0.2% to about 0.6%, or about 0.2% to about 0.5%, or about 0.3% to about 1%, or about 0.3% to about 0.8%, or about 0.3% to about 0.6%, or about 0.3% to about 0.5% of the weight of the cement present in the slurry, for example containing a Portland cement, or a Portland cement and a slag cement.

In some embodiments, the slurry further contains a superplasticizer, for example, a weight of the superplasticizer that is about 0.1% to about 5%, about 0.1% to about 2.5%, or about 0.1% to about 1.5%, or about 0.1% to about 1%, or about 0.1% to about 0.75%, or about 0.25% to about 5%, or about 0.25% to about 2.5%, or about 0.25% to about 1.5%, or about 0.25% to about 1%, or about 0.25% to about 0.75%, or about 0.5% to about 5%, or about 0.5% to about 2.5%, or about 0.5% to about 1.5%, or about 0.5% to about 1%, or about 0.5% to about 0.75% of the weight of the cement present in the slurry. In some embodiments of the slurry, the superplasticizer is a polycarboxylate ether. Examples of polycarboxylate superplasticizers include Ethacryl G (Coatex, Arkema Group), Liquiment® 1641F and Liquiment® 5581F (BASF), and ADVA 195 (W. R. Grace).

For example, the weight of polycarboxylate ether present in the slurry can be about 0.1% to about 1.5%, or about 0.1% to about 1%, or about 0.1% to about 0.75%, or about 0.25% to about 1.5%, or about 0.25% to about 1%, or about 0.25% to about 0.75%, or about 0.5% to about 1.5%, or about 0.5% to about 1%, or about 0.5% to about 0.75% of the weight of the cement present in the slurry, for example, containing a Portland cement, or a Portland cement and a slag cement.

In some embodiments, the slurry further contains a defoamer, for example, a weight of the defoamer that is about 0.001% to about 0.2%, or about 0.001% to about 0.1%, or about 0.001% to about 0.05%, or about 0.005% to about 0.2%, or about 0.005% to about 0.1%, or about 0.005% to about 0.05%, or about 0.01% to about 0.2%, or about 0.01% to about 0.1%, or about 0.01% to about 0.05% of the weight of the cement present in the slurry, for example, containing a Portland cement, or a Portland cement and a slag cement. Exemplary defoamers include polyols, fatty acid esters, ethyl hexanol, and the like.

In some embodiments, cement and water are present in the slurry in a weight ratio of about 3:1 to about 1:1, such as about 3:1 to about 1.25:1, or about 3:1 to about 1.5:1, or about 2.5:1 to about 1:1, or about 2.5:1 to about 1.25:1, or about 2.5:1 to about 1.5:1, or about 2:1 to about 1:1, or about 2:1 to about 1.25:1, or about 2:1 to about 1.5:1. Cement, for example including a Portland cement, or including a Portland cement and a slag cement, and water are present in the slurry in a weight ratio of about 1:1, or about 1.25:1, or about 1:5:1, or about 1.75:1, or about 2:1, or about 2.25:1.

In an example, the cement contains a Portland cement, the slurry further contains an API Class G cement, the weight of the copolymer present in the slurry is about 0.05% to about 10% of the weight of the cement present in the slurry, the weight of the graft copolymer present in the slurry is about 0.05% to about 10% of the weight of the cement present in the slurry, the weight of API Class G cement present in the slurry is about 0.1% to about 35% of the weight of the cement present in the slurry; and the cement and water are present in the slurry in a weight ratio of about 3:1 to about 1:1. The cement may contain at least about 40 wt %, or at least about 50 wt %, or at least about 60 wt %, or at least about 70 wt %, or at least about 80 wt %, or at least about 90 wt %, or at least about 95 wt %, or at least about 97.5 wt %, or at least about 99 wt % of a Portland cement, or the cement may contain about 50 wt % to about 90 wt % of a Portland cement, and about 10 wt % to about 50 wt % of a slag cement.

The slurry may exhibit improved fluid loss as compared to a slurry lacking the copolymer, graft copolymer, or both. In some embodiments, the slurry exhibits a fluid loss of about 0 mL per 30 min. to about 150 mL per 30 min., or about 0 mL per 30 min. to about 125 mL per 30 min., or about 0 mL per 30 min. to about 100 mL per 30 min., or about 0 mL per 30 min. to about 75 mL per 30 min., or about 0 mL per 30 min. to about 50 mL per 30 min., or about 0 mL per 30 min. to about 40 mL per 30 min., or about 10 mL per 30 min. to about 150 mL per 30 min., or about 10 mL per 30 min. to about 125 mL per 30 min., or about 10 mL per 30 min. to about 100 mL per 30 min., or about 10 mL per 30 min. to about 75 mL per 30 min., or about 10 mL per 30 min. to about 50 mL per 30 min., or about 10 mL per 30 min. to about 40 mL per 30 min., or about 20 mL per 30 min. to about 150 mL per 30 min., or about 20 mL per 30 min. to about 125 mL per 30 min., or about 20 mL per 30 min. to about 100 mL per 30 min., or about 20 mL per 30 min. to about 75 mL per 30 min., or about 20 mL per 30 min. to about 50 mL per 30 min., or about 20 mL per 30 min. to about 40 mL per 30 min., measured at an operating temperature of about 180° F. For example, the slurry may exhibit a fluid loss of about 25 mL per 30 min., or about 30 mL per 30 min., or about 35 mL per 30 min., or about 40 mL per 30 min., or about 45 mL per 30 min., or about 50 mL per 30 min., or about 55 mL per 30 min., or about 60 mL per 30 min., or about 65 mL per 30 min., or about 70 mL per 30 min., or about 75 mL per 30 min., or about 80 mL per 30 min., or about 85 mL per 30 min., or about 90 mL per 30 min., or about 95 mL per 30 min., or about 100 mL per 30 min., measured at an operating temperature of about 180° F.

In some embodiments, the density of the slurry is about 8 lbs./gal. to about 20 lbs./gal., or about 8 lbs./gal. to about 18 lbs./gal., or about 8 lbs./gal. to about 17 lbs./gal., or about 10 lbs./gal. to about 20 lbs./gal., or about 10 lbs./gal. to about 18 lbs./gal., or about 10 lbs./gal. to about 17 lbs./gal., or about 14 lbs./gal. to about 20 lbs./gal., or about 14 lbs./gal. to about 18 lbs./gal., or about 14 lbs./gal. to about 17 lbs./gal. For example, the density of the slurry may be about 10 lbs./gal., or about 11 lbs./gal., or about 12 lbs./gal., or about 13 lbs./gal., or about 14 lbs./gal., or about 15 lbs./gal., or about 16 lbs./gal., or about 17 lbs./gal., or about 18 lbs./gal., or about 20 lbs./gal.

In some embodiments, the plastic viscosity of the slurry is about 20 cP to about 1,000 cP, or about 20 cP to about 750 cP, or about 20 cP to about 500 cP, or about 50 cP to about 1,000 cP, or about 50 cP to about 750 cP, or about 50 cP to about 500 cP, or about 100 cP to about 1,000 cP, or about 100 cP to about 750 cP, or about 100 cP to about 500 cP. For example, the plastic viscosity of the slurry may be about 20 cP, or about 50 cP, or about 75 cP, or about 100 cP, or about 150 cP, or about 200 cP, or about 250 cP, or about 300 cP, or about 350 cP, or about 400 cP, or about 450 cP, or about 500 cP, or about 600 cP, or about 700 cP, or about 800 cP, or about 900 cP, or about 1,000 cP.

In some embodiments, the yield point of the slurry is about 0.1 lbf/100 ft$^2$ to about 50 lbf/100 ft$^2$, or about 0.1 lbf/100 ft$^2$ to about 35 lbf/100 ft$^2$, or about 0.1 lbf/100 ft$^2$ to about 20 lbf/100 ft$^2$, or about 0.5 lbf/100 ft$^2$ to about 50 lbf/100 ft$^2$, or about 0.5 lbf/100 ft$^2$ to about 35 lbf/100 ft$^2$, or about 0.5 lbf/100 ft$^2$ to about 20 lbf/100 ft$^2$, or about 1 lbf/100 ft$^2$ to about 50 lbf/100 ft$^2$, or about 1 lbf/100 ft$^2$ to about 35 lbf/100 ft$^2$, or about 1 lbf/100 ft$^2$ to about 20 lbf/100 ft$^2$. For example, the yield point of the slurry may be about 0.1 lbf/100 ft$^2$, or about 0.5 lbf/100 ft$^2$, or about 1 lbf/100 ft$^2$, or about 2.5 lbf/100 ft$^2$, or about 5 lbf/100 ft$^2$, or about 7.5 lbf/100 ft$^2$, or about 10 lbf/100 ft$^2$, or about 12.5 lbf/100 ft$^2$, or about 15 lbf/100 ft$^2$, or about 17.5 lbf/100 ft$^2$, or about 20 lbf/100 ft$^2$, or about 25 lbf/100 ft$^2$, or about 30 lbf/100 ft$^2$, or about 35 lbf/100 ft$^2$, or about 40 lbf/100 ft$^2$, or about 45 lbf/100 ft$^2$, or about 50 lbf/100 ft$^2$.

Methods

Also provided in this disclosure are methods for controlling fluid loss of a cement slurry. In various embodiments, the method includes adding a fluid loss control additive of the present disclosure to a cement slurry. In some embodiments, the method includes slurrying a mixture of cement and a fluid loss control additive of the present disclosure.

In some embodiments of the controlling method, the method includes mixing, in any order, water, a cement, a copolymer containing 2-acrylamido-2-methylpropane sulfonic acid monomer units and acryloylmorpholine monomer units, and a graft copolymer containing humate and, grafted onto the humate, a side-chain polymer including at least one of acrylamide monomer units, acryloylmorpholine monomer units, acrylic acid monomer units, and 2-acrylamido-2-methylpropane sulfonic acid monomer units. The cement can be any cement of the present disclosure. The copolymer can be any copolymer of the present disclosure. The graft copolymer can be any graft copolymer of the present disclosure. The method includes in some examples mixing, in any order, water, the cement, the copolymer, the graft copolymer, and one or more of a retarder, a superplasticizer, and a defoamer. The retarder can be any retarder of the present disclosure. The superplasticizer can be any superplasticizer of the present disclosure. The defoamer can be any defoamer of the present disclosure.

For example, the controlling method includes mixing an amount of copolymer having a weight that is about 0.05% to about 10% of the weight of the cement, an amount of the graft copolymer having a weight that is about 0.05% to about 10% of the weight of the cement, an amount of the API Class G cement having a weight that is about 0.1% to about 35% of the weight of the cement, and water in a weight ratio to the cement of about 1:3 to about 1:1.

In some embodiments of the controlling method, the method includes mixing the cement, the copolymer, and the graft copolymer to form a dry blend, and then mixing the dry blend with water. The method may include mixing the cement and water to form a slurry, and then mixing the slurry with the copolymer and the graft copolymer. In other examples, the method includes mixing, in any order, the cement, the copolymer, and the graft copolymer with a drilling fluid containing water.

Also provided in this disclosure are methods for cementing an oil well. In some embodiments, the method includes providing to an oil well a cement slurry including a fluid loss control additive of the present disclosure. The providing can occur above the surface, or in the subterranean formation. The subterranean formation in some examples contains a wellbore containing a steel casing or multiple casings, a cement sheath in the annuli, and optionally a packer and a production tubing. In some embodiments of the cementing method, the method further includes drilling at least a portion of the oil well, and providing the cement slurry includes using the cement slurry as a drilling fluid. In other embodiments of the cementing method, the method further includes drilling at least a portion of the oil well using a drilling fluid containing water, and providing the cement slurry includes mixing the drilling fluid with a cement and a fluid loss control additive of the present disclosure.

In some embodiments, the cementing method includes providing to an oil well a slurry including water, a cement, a copolymer containing 2-acrylamido methylpropane sulfonic acid monomer units and acryloylmorpholine monomer units, and a graft copolymer containing humate and, grafted onto the humate, a side-chain polymer including at least one of acrylamide monomer units, acryloylmorpholine monomer units, acrylic acid monomer units, and 2-acrylamido-2-methylpropane sulfonic acid monomer units. The method can further include drilling at least a portion of the oil well using a drilling fluid containing water, where providing the cement slurry includes mixing, in any order, the cement, the copolymer, and the graft copolymer with the drilling fluid including water.

The cement can be any cement of the present disclosure. The copolymer can be any copolymer of the present disclosure. The graft copolymer can be any graft copolymer of the present disclosure. The slurry can in some examples further contain one or more of a retarder, a superplasticizer, and a defoamer. The retarder can be any retarder of the present disclosure. The superplasticizer can be any superplasticizer of the present disclosure. The defoamer can be any defoamer of the present disclosure.

For example, the slurry for cementing includes an amount of copolymer having a weight that is about 0.05% to about 10% of the weight of the cement, an amount of the graft copolymer having a weight that is about 0.05% to about 10% of the weight of the cement, an amount of the API Class G cement having a weight that is about 0.1% to about 35% of the weight of the cement, water in a weight ratio to the cement of about 3:1 to about 1:1.

FIG. 1 is a process flow diagram of a method 100 of controlling fluid loss of a cement slurry. The method includes, at block 102, mixing in any order water, a cement, a copolymer containing 2-acrylamido-2-methylpropane sulfonic acid monomer units and acryloylmorpholine monomer units, and a graft copolymer containing a humate and, grafted onto the humate, acrylamide monomer units, acryloylmorpholine monomer units, acrylic acid monomer units, and 2-acrylamide-2-methylpropane sulfonic acid monomer units.

FIG. 2 is a process flow diagram of a method 200 of cementing an oil well. The method includes, at block 202, providing to an oil well a slurry including water, a cement, a copolymer containing 2-acrylamido-2-methylpropane sulfonic acid monomer units and acryloylmorpholine monomer units, and a graft copolymer containing humate and, grafted onto the humate, acrylamide monomer units, acryloylmorpholine monomer units, acrylic acid monomer units, and 2-acrylamide-2-methylpropane sulfonic acid monomer units.

EXAMPLES

Example 1—Slurry Preparation

A blend of Portland cement and slag cement (Dyckerhoff MIKRODUR), a copolymer of 2-acrylamido-2-methylpropane sulfonic acid monomer units and acrylic acid monomer units ("AMPS/AA"), ZnO, and a copolymer of 2-acrylamido-2-methylpropane sulfonic acid and acryloylmorpholine ("AMPS/ACMO") were dry blended together. Diethylenetriamine penta(methylene phosphonic acid) ("DTPMP"), a defoamer, and a polycarboxylate ether superplasticizer (Coatex ETHACRYL G) were added to water. The dry blend and mix water were blended according to American Petroleum Institute (API) Recommended Practice 10B-2 to form Slurry C of Table 1, below, which could typically be used at a temperature of about 75° F. to about 300° F. The density of slurry C was 15.8 lbs./gal.

A blend of Portland cement and slag cement (Dyckerhoff Mikrodur), a copolymer of 2-acrylamido-2-methylpropane sulfonic acid monomer units and acrylic acid monomer units ("AMPS/AA"), ZnO, a copolymer of 2-acrylamido-2-methylpropane sulfonic acid monomer units and acryloylmorpholine monomer units ("AMPS/ACMO") and a graft copolymer of acrylamide monomer units, acryloylmorpholine monomer units, acrylic acid monomer units, and 2-acrylamide-2-methylpropane sulfonic acid monomer units grafted onto humic acid ("Humate Graft") were dry blended together. Diethylenetriamine penta(methylene phosphonic acid) ("DTPMP"), a defoamer, and a polycarboxylate ether superplasticizer (Coatex ETHACRYL G) were added to water. The dry blend and mix water were blended according to API Recommended Practice 10B-2 to form Slurry 1 of Table 1, below, which could typically be used at a temperature of about 60° F. to about 350° F. The density of slurry 1 was 15.8 lbs./gal.

A blend of Portland cement and slag cement (Dyckerhoff Mikrodur), an API Class G cement (Saudi G cement), a copolymer of 2-acrylamido-2-methylpropane sulfonic acid monomer units and acrylic acid monomer units ("AMPS/AA"), ZnO, a copolymer of 2-acrylamido-2-methylpropane sulfonic acid monomer units and acryloylmorpholine monomer units ("AMPS/ACMO") and a graft copolymer of acrylamide monomer units, acryloylmorpholine monomer units, acrylic acid monomer units, and 2-acrylamide-2-methylpropane sulfonic acid monomer units grafted onto humic acid ("Humate Graft") were dry blended together. Diethylenetriamine penta(methylene phosphonic acid) ("DTPMP"), a defoamer, and a polycarboxylate ether superplasticizer (Coatex Ethacryl G) were added to water. The dry blend and mix water were blended according to API Recommended Practice 10B-2 to form Slurry 2 of Table 1, below, which could typically be used at a temperature of about 75° F. to about 300° F. The density of slurry 2 was 15.8 lbs./gal.

A blend of Portland cement and slag cement (Dyckerhoff Mikrodur), an API Class G cement (Saudi G cement), a copolymer of 2-acrylamido-2-methylpropane sulfonic acid monomer units and acrylic acid monomer units ("AMPS/AA"), ZnO, a copolymer of 2-acrylamido-2-methylpropane sulfonic acid monomer units and acryloylmorpholine monomer units ("AMPS/ACMO") and a graft copolymer of acrylamide monomer units, acryloylmorpholine monomer units, acrylic acid monomer units, and 2-acrylamide-2-methylpropane sulfonic acid monomer units grafted onto humic acid ("Humate Graft") were dry blended together. Diethylenetriamine penta(methylene phosphonic acid) ("DTPMP"), a defoamer, and a polycarboxylate ether superplasticizer (Coatex Ethacryl G) were added to water. The dry blend and mix water were blended according to API Recommended Practice 10B-2 to form Slurry 2 of Table 1, below, which could typically be used at a temperature of about 75° F. to about 300° F.

TABLE 1

| Component | Slurry Composition | | |
| --- | --- | --- | --- |
| | Slurry C | Slurry 1 | Slurry 2 |
| Mikrodur (g) | 796.01 | 792.57 | 753.17 |
| G Cement (g) | — | — | 37.81 |

TABLE 1-continued

| Slurry Composition | | | |
|---|---|---|---|
| Component | Slurry C | Slurry 1 | Slurry 2 |
| AMPS/AA (g) | 3.32 | 3.31 | 3.31 |
| ZnO (g) | 3.32 | 3.31 | 3.31 |
| AMPS/ACMO (g) | — | 9.00 | 8.00 |
| Humate Graft (g) | 11.00 | 9.00 | 8.00 |
| Ethacryl G (g) | 4.00 | 4.00 | 5.00 |
| DTPMP (g) | 3.32 | 3.31 | 3.31 |
| Defoamer (g) | 0.56 | 0.56 | 0.53 |
| Water (g) | 398.0 | 396.29 | 436.0 |

Example 2—Rheology Testing

Rheology of slurries prepared according to Example 1 were obtained using a Grace M3600 benchtop viscometer. Results at ambient temperature and at 180° F. are shown below in Table 2 and Table 3, respectively.

TABLE 2

| Rheology Testing (Ambient) | | | | | | |
|---|---|---|---|---|---|---|
| | Slurry C | | Slurry 1 | | Slurry 2 | |
| RPM | Up | Down | Up | Down | Up | Down |
| 3 | 19 | 15 | 20 | 49 | 19 | 43 |
| 6 | 26 | 17 | 321 | 52 | 34 | 44 |
| 100 | 99 | 85 | 196 | 218 | 186 | 195 |
| 200 | 159 | 146 | 359 | 372 | 324 | 325 |
| 300 | 215 | 205 | 388 | 393 | 373 | 380 |
| 600 | 368 | — | 392 | — | 379 | — |

TABLE 3

| Rheology Testing (180° F.) | | | | | | |
|---|---|---|---|---|---|---|
| | Slurry C | | Slurry 1 | | Slurry 2 | |
| RPM | Up | Down | Up | Down | Up | Down |
| 3 | 27 | 21 | 38 | 32 | 22 | 32 |
| 6 | 33 | 22 | 61 | 37 | 35 | 34 |
| 100 | 100 | 77 | 304 | 175 | 177 | 143 |
| 200 | 142 | 119 | 386 | 279 | 278 | 250 |
| 300 | 172 | 153 | 388 | 352 | 367 | 346 |
| 600 | 237 | — | 389 | — | 384 | — |

Slurry C showed slight gelling at ambient temperature and at 180° F. Slurry 2 showed gelling at ambient temperatures and at 180° F. Slurry 2 mixed well.

Example 3—Fluid-Loss Testing

Slurries prepared according to Example 1 and other comparative slurries lacking a copolymer of 2-acrylamido-2-methylpropane sulfonic acid monomer units and acryloylmorpholine monomer units and lacking a graft copolymer of acrylamide monomer units, acryloylmorpholine monomer units, acrylic acid monomer units, and 2-acrylamide-2-methylpropane sulfonic acid monomer units grafted onto humic acid were tested for fluid loss at 180° F. according API Recommended Practice 10B-2. Results for Slurry C, Slurry 1, and Slurry 2 are shown in Table 4, below.

TABLE 4

| | Temp. (° F.) | Time (min.) | Blew Out (Y/N) | Filtrate (mL) | Fluid Loss (mL) |
|---|---|---|---|---|---|
| Slurry C | 180 | 30 | N | 20 | 140 |
| Slurry 1 | 180 | 30 | N | 15 | 86 |
| Slurry 2 | 180 | 30 | N | 19 | 38 |

All other comparative slurries (not shown) blew out.

Figure 4:
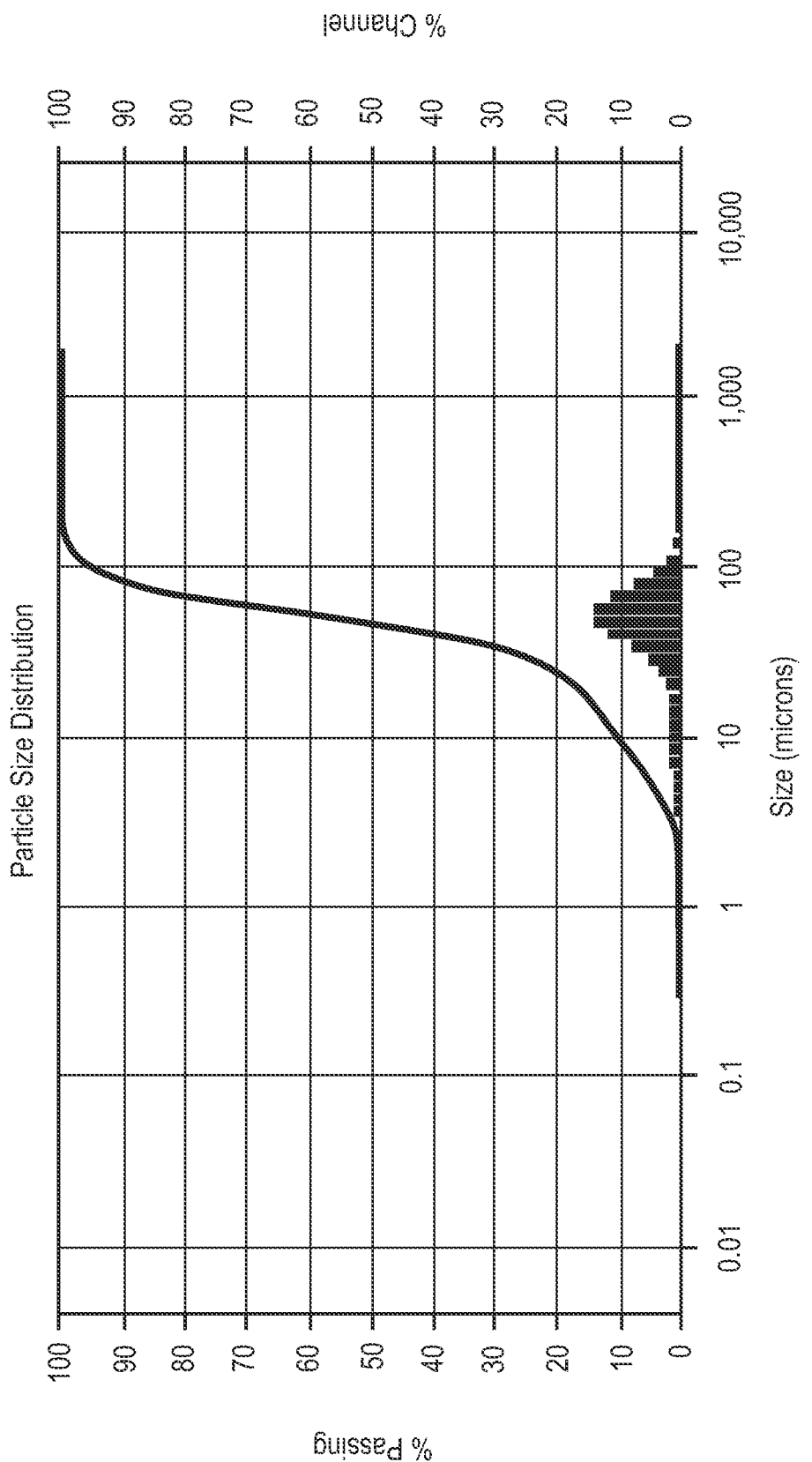
FIG. 4 is a graph showing the particle size distribution of an American Petroleum Institute (API) Class G cement.

The results demonstrate that Portland cement-containing slurries including a copolymer of 2-acrylamido-2-methylpropane sulfonic acid monomer units and acryloylmorpholine monomer units and a graft copolymer of acrylamide monomer units, acryloylmorpholine monomer units, acrylic acid monomer units, and 2-acrylamide-2-methylpropane sulfonic acid monomer units grafted onto humic acid exhibited improved fluid loss control, and further exhibited rheological properties suitable for pumping, for example, downhole. The results also demonstrate that the combination of the additive with an API Class G cement can limit or even inhibit gelation behavior of a Portland cement-containing slurry. Without wishing to be bound by any particular theory, if is believed that the smaller particle size of Mikrodur (see FIG. 3) makes it susceptible to excessive fluid loss, and that the inclusion of Saudi G cement, having a larger particle size (see FIG. 4), ameliorates this problem when used in combination with a combination of a copolymer of 2-acrylamido-2-methylpropane sulfonic acid monomer units and acryloylmorpholine monomer units and a graft copolymer of acrylamide monomer units, acryloylmorpholine monomer units, acrylic acid monomer units, and 2-acrylamide-2-methylpropane sulfonic acid monomer units grafted onto humic acid.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in this disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble. Any cement can be used in the compositions of the present disclosure.

As used in this disclosure, the term "Portland cement" refers to cements including ground Portland clinker.

As used in this disclosure, the term "slag cement" can be used interchangeably with "blast-furnace slag cement" and "ground-granulated blast-furnace slag" and refers to cements including ground blast furnace slag.

As used in this disclosure, the term "set" can mean the process of a fluid slurry (for example, a cement slurry) becoming a hard solid. Depending on the composition and the conditions, it can take just a few minutes up to 72 hours or longer for some sealant compositions to initially set.

As used in this disclosure, the term "retarder" refers to compounds that delay the set time of a cement slurry.

As used in this disclosure, the term "superplasticizer" refers to polymers that function as dispersants to improve the theology of a cement slurry. In some embodiments, a cement slurry including a superplasticizer includes less water as compared to a cement slurry lacking a superplasticizer.

As used in this disclosure, the term "defoamer" can be used interchangeably with "anti-foaming agent" and refs to compounds that reduce or inhibit the formation of foam in a cement slurry.

As used in this disclosure, the term "humate" refers to the products of natural flocculation or precipitation in sand deposits, or humic substances derived from leaching of decaying plants and animal materials. As used in this disclosure, the term "humate" includes both humate, humic acids found in humate, and salts thereof.

As used in this disclosure, the term "monomer unit," used in reference to a polymer, refers to a monomer, or residue of a monomer, that has been incorporated into at least a portion of the polymer.

As used in this disclosure, the term "graft copolymer" refers to a copolymer containing two or more chains of constitutionally or configurationally different features, one of which is a main chain, also referred to as a backbone, and others of which are side chains bonded to the main chain.

As used in this disclosure, the term "side chain" can be used interchangeably with "side-chain polymer" and refers to a polymer grafted onto the main chain of a graft copolymer.

As used in this disclosure, the term "grafted" refers to the relationship of side chains to the main chain of a graft copolymer. A graft copolymer including grafted side chain polymers can be the product of polymerizing monomer units to form a polymer, and then bonding the resulting polymers to, for example, humic acid, through the chemical functionality thereof. A graft copolymer including grafted side chain polymers can also be the product of polymerizing monomers in the presence of, for example, humic acid, to form side-chain polymers bonded, for example, through the chemical functionality of the humic acid.

As used in this disclosure, the term "fluid loss" refers generally to the loss of water from a cement slurry into materials surrounding the cement slurry. Unless otherwise specified, specific fluid loss values in this disclosure are measured according to American Petroleum Institute (API) Recommended Practice 10B-2.

As used in this disclosure, "zonal isolation" means the prevention of fluids, such as water or gas, in one zone of a well or subterranean formation, from mixing with oil in another zone.

The term "downhole," as used in this disclosure, can refer to under the surface of the earth, such as a location within or fluidly connected to a wellbore.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Embodiments

An embodiment of the present disclosure provides a fluid loss control additive including a copolymer containing 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units. In an aspect, the side-chain polymer contains acryloylmorpholine monomer units and 2-acrylamido-2-methylpropane sulfonic acid monomer units.

In an aspect, the 2-acrylamido-2-methylpropane sulfonic acid monomer units make up about 10% to about 90% of a total number of monomer units of the copolymer, and the acryloylmorpholine monomer units make up about 10% to about 90% of a total number of monomer units of the copolymer. In an aspect, the the 2-acrylamido-2-methylpropane sulfonic acid monomer units make up about 40% to about 80% of a total number of monomer units of the copolymer, and the acryloylmorpholine monomer units make up about 20% to about 60% of a total number of monomer units of the copolymer.

In an aspect, the acrylamide monomer units make up about 5% to about 85% of a total number of monomer units of the side-chain polymer, and the acryloylmorpholine monomer units make up about 5% to about 85% of a total number of monomer units of the side-chain polymer. In an aspect, the acrylamide monomer units make up about 10% to about 40% of a total number of monomer units of the side-chain polymer, the acryloylmorpholine monomer units make up about 5% to about 35% of a total number of monomer units of the side-chain polymer, the acrylic acid monomer units make up about 10% to about 40% of a total number of monomer units of the side-chain polymer, and the 2-acrylamido-2-methylpropane sulfonic acid monomer units make up about 20% to about 75% of a total number of monomer units of the side-chain polymer. In an aspect, the humate makes up about 1 wt % to about 20 wt % of the graft copolymer.

In an aspect, the copolymer and the graft copolymer are present in the additive in a weight ratio of about 100:1 to about 1:100. In an aspect, the copolymer and the graft copolymer are present in the additive in a weight ratio of about 4:1 to about 1:4.

In an aspect, the fluid loss additive contains about 20 wt % to about 80 wt % of the copolymer, and about 20 wt % to about 80 wt % of the graft copolymer. In an aspect, the copolymer and the graft copolymer are present in a combined amount of at least about 80 wt % of the additive.

An embodiment of the present disclosure provides a slurry containing water, a cement, a copolymer of 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units. In an aspect of the slurry, the side-chain polymer contains acryloylmorpholine monomer units and 2-acrylamido-2-methylpropane sulfonic acid monomer units. In an aspect, the cement contains a Portland cement. In an aspect, the cement contains a Portland cement and a slag cement.

In an aspect, a weight of the copolymer present in the slurry is about 0.05% to about 10% of a weight of the cement present in the slurry, and a weight of the graft copolymer present in the slurry is about 0.05% to about 10% of the weight of the cement present in the slurry. In an aspect, a weight of the copolymer present in the slurry is about 0.1% to about 5% of a weight of the cement present in the slurry, and a weight of the graft copolymer present in the slurry is about 0.1% to about 5% of the weight of the cement present in the slurry.

In an aspect, the slurry further contains an American Petroleum Institute (API) Class G cement. In an aspect, a weight of the API Class G cement present in the slurry is about 0.1% to about 35% of a weight of the cement present in the slurry. In an aspect, a weight of the API Class G cement present in the slurry is about 0.5% to about 10% of a weight of the cement present in the slurry.

In an aspect, the slurry further contains at least one retarder, and a total weight of the at least one retarder is about 0.1% to about 35% of a weight of the cement present in the slurry. In an aspect, the slurry further contains zinc oxide, diethylenetriamine penta(methylene phosphonic acid), and a second copolymer containing 2-acrylamido-2-methylpropane sulfonic acid monomer units and acrylic acid monomer units, and a weight of the zinc oxide present in the slurry is about 0.1% to about 1% of a weight of the cement present in the slurry, a weight of the diethylenetriamine penta(methylene phosphonic acid) present in the slurry is about 0.1% to about 1% of a weight of the cement present in the slurry, and a weight of the second copolymer present in the slurry is about 0.1% to about 1% of the weight of the cement present in the slurry.

In an aspect, the slurry further contains at least one superplasticizer, and a total weight of the at least one superplasticizer present in the slurry is about 0.1% to about 5% of a weight of the cement present in the slurry. In an aspect, the slurry further contains a polycarboxylate ether, and a weight of the polycarboxylate ether present in the slurry is about 0.1% to about 1.5% of a weight of the cement present in the slurry. In an aspect, the slurry further contains a defoamer, and a total weight of the defoamer is about 0.001% to about 0.2% of a weight of the cement present in the slurry. In an aspect, the cement and the water are present in the slurry in a weight ratio of about 3:1 to about 1:1.

In an aspect, the slurry further contains an API Class G cement, and the cement contains a Portland cement, a weight of the copolymer present in the slurry is about 0.05% to about 10% of a weight of the cement present in the slurry, a weight of the graft copolymer present in the slurry is about 0.05% to about 10% of the weight of the cement present in the slurry, a weight of the API Class G cement present in the slurry is about 0.1% to about 35% of the weight of the cement present in the slurry, and the cement and the water are present in the slurry in a weight ratio of about 3:1 to about 1:1.

In an aspect, a fluid loss of the slurry is about 0 mL per 30 min. to about 150 mL per 30 min., measured at an operating temperature of about 180° F. according to API Recommended Practice 10B-2. In an aspect, a fluid loss of the slurry is about 0 mL per 30 min to about 50 mL per 30 min., measured at an operating temperature of about 180° F. according to API Recommended Practice 10B-2. In an aspect, a density of the slurry of about 10 lbs./gal. to about 17 lbs./gal.

An embodiment of the present disclosure provides a method of controlling fluid loss of a cement slurry. The method includes mixing, in any order, water, a cement, a copolymer containing 2-acrylamido-2-methylpropane sulfonic acid monomer units and acryloylmorpholine monomer units, and a graft copolymer. The graft copolymer contains a humate and, grafted onto the humate, a side-chain polymer containing at least one of acrylamide monomer units, acryloylmorpholine monomer units, acrylic acid monomer units, and 2-acrylamido-2-methylpropane sulfonic acid monomer units. In an aspect, the method includes mixing a drilling fluid containing water with, in any order, the cement, the copolymer, and the graft copolymer.

Other implementations are also within the scope of the following claims.

What is claimed is:

1. A fluid loss control additive comprising:
a copolymer comprising 2-acrylamido-2-methylpropane sulfonic acid monomer units and acryloylmorpholine monomer units; and
a graft copolymer comprising a humate and, grafted onto the humate, a side-chain polymer comprising:
acrylamide monomer units;
acryloylmorpholine monomer units;
acrylic acid monomer units; and
2-acrylamido-2-methylpropane sulfonic acid monomer units;
wherein:
the acrylamide monomer units comprise about 10% to about 40% of a total number of monomer units of the side-chain polymer;
the acryloylmorpholine monomer units comprise about 5% to about 35% of a total number of monomer units of the side-chain polymer;
the acrylic acid monomer units comprise about 10% to about 40% of a total number of monomer units of the side-chain polymer; and
the 2-acrylamido-2-methylpropane sulfonic acid monomer units comprise about 20% to about 75% of a total number of monomer units of the side-chain polymer.

2. The fluid loss control additive of claim 1, wherein:
the 2-acrylamido-2-methylpropane sulfonic acid monomer units comprise about 10% to about 90% of a total number of monomer units of the copolymer; and
the acryloylmorpholine monomer units comprise about 10% to about 90% of a total number of monomer units of the copolymer.

3. The fluid loss control additive of claim 1, wherein:
the 2-acrylamido-2-methylpropane sulfonic acid monomer units comprise about 40% to about 80% of a total number of monomer units of the copolymer; and
the acryloylmorpholine monomer units comprise about 20% to about 60% of a total number of monomer units of the copolymer.

4. The fluid loss control additive of claim 1, wherein the humate comprises about 1 wt % to about 20 wt % of the graft copolymer.

5. The fluid loss control additive of claim 1, wherein the copolymer and the graft copolymer are present in the additive in a weight ratio of about 100:1 to about 1:100.

6. The fluid loss control additive of claim 1, wherein the copolymer and the graft copolymer are present in the additive in a weight ratio of about 4:1 to about 1:4.

7. The fluid loss control additive of claim 1, comprising:
about 20 wt % to about 80 wt % of the copolymer; and
about 20 wt % to about 80 wt % of the graft copolymer.

8. The fluid loss control additive of claim 1, wherein the copolymer and the graft copolymer are present in a combined amount of at least about 80 wt % of the additive.

9. A slurry, comprising:
water;
a cement;
a copolymer of 2-acrylamido-2-methylpropane sulfonic acid monomer units and acryloylmorpholine monomer units; and
a graft copolymer comprising a humate and, grafted onto the humate, a side-chain polymer comprising:
acrylamide monomer units;
acryloylmorpholine monomer units;
acrylic acid monomer units; and
2-acrylamido-2-methylpropane sulfonic acid monomer units;
wherein:
the acrylamide monomer units comprise about 10% to about 40% of a total number of monomer units of the side-chain polymer;
the acryloylmorpholine monomer units comprise about 5% to about 35% of a total number of monomer units of the side-chain polymer;
the acrylic acid monomer units comprise about 10% to about 40% of a total number of monomer units of the side-chain polymer; and
the 2-acrylamido-2-methylpropane sulfonic acid monomer units comprise about 20% to about 75% of a total number of monomer units of the side-chain polymer.

10. The slurry of claim 9, wherein the cement comprises a Portland cement.

11. The slurry of claim 9, wherein the cement comprises a Portland cement and a slag cement.

12. The slurry of claim 9, wherein:
a weight of the copolymer present in the slurry is about 0.05% to about 10% of a weight of the cement present in the slurry; and
a weight of the graft copolymer present in the slurry is about 0.05% to about 10% of the weight of the cement present in the slurry.

13. The slurry of claim 9, wherein:
a weight of the copolymer present in the slurry is about 0.1% to about 5% of a weight of the cement present in the slurry; and
a weight of the graft copolymer present in the slurry is about 0.1% to about 5% of the weight of the cement present in the slurry.

14. The slurry of claim 9, further comprising an American Petroleum Institute (API) Class G cement.

15. The slurry of claim 13, wherein a weight of the API Class G cement present in the slurry is about 0.1% to about 35% of a weight of the cement present in the slurry.

16. The slurry of claim 13, wherein a weight of the API Class G cement present in the slurry is about 0.5% to about 10% of a weight of the cement present in the slurry.

17. The slurry of claim 9, further comprising at least one retarder, wherein a total weight of the at least one retarder is about 0.1% to about 35% of a weight of the cement present in the slurry.

18. The slurry of claim 9, further comprising:
zinc oxide;
diethylenetriamine penta(methylene phosphonic acid); and
a second copolymer comprising 2-acrylamido-2-methylpropane sulfonic acid monomer units and acrylic acid monomer units;
wherein:
a weight of the zinc oxide present in the slurry is about 0.1% to about 1% of a weight of the cement present in the slurry;
a weight of the diethylenetriamine penta(methylene phosphonic acid) present in the slurry is about 0.1% to about 1% of a weight of the cement present in the slurry; and
a weight of the second copolymer present in the slurry is about 0.1% to about 1% of the weight of the cement present in the slurry.

19. The slurry of claim 9, further comprising at least one superplasticizer, wherein a total weight of the at least one superplasticizer present in the slurry is about 0.1% to about 5% of a weight of the cement present in the slurry.

20. The slurry of claim 9, further comprising a polycarboxylate ether, wherein a weight of the polycarboxylate ether present in the slurry is about 0.1% to about 1.5% of a weight of the cement present in the slurry.

21. The slurry of claim 9, further comprising a defoamer, wherein a total weight of the defoamer is about 0.001% to about 0.2% of a weight of the cement present in the slurry.

22. The slurry of claim 9, wherein the cement and the water are present in the slurry in a weight ratio of about 3:1 to about 1:1.

23. The slurry of claim 9, further comprising an API Class G cement, wherein:
the cement comprises a Portland cement;
a weight of the copolymer present in the slurry is about 0.05% to about 10% of a weight of the cement present in the slurry;
a weight of the graft copolymer present in the slurry is about 0.05% to about 10% of the weight of the cement present in the slurry;
a weight of the API Class G cement present in the slurry is about 0.1% to about 35% of the weight of the cement present in the slurry; and
the cement and the water are present in the slurry in a weight ratio of about 3:1 to about 1:1.

24. The slurry of claim 9, comprising a fluid loss of about 0 mL per 30 min. to about 150 mL per 30 min., measured at an operating temperature of about 180° F. according to API Recommended Practice 10B-2.

25. The slurry of claim 9, comprising a fluid loss of about 0 mL per 30 min to about 50 mL per 30 min., measured at an operating temperature of about 180° F. according to API Recommended Practice 10B-2.

26. The slurry of claim 9, comprising a density of about 10 lbs./gal. to about 17 lbs./gal.

27. A method of controlling fluid loss of a cement slurry, the method comprising mixing, in any order:
water;
a cement;
a copolymer comprising 2-acrylamido-2-methylpropane sulfonic acid monomer units and acryloylmorpholine monomer units; and
a graft copolymer comprising a humate and, grafted onto the humate, a side-chain polymer comprising:
acrylamide monomer units;
acryloylmorpholine monomer units;
acrylic acid monomer units; and
2-acrylamido-2-methylpropane sulfonic acid monomer units;
wherein:
the acrylamide monomer units comprise about 10% to about 40% of a total number of monomer units of the side-chain polymer;
the acryloylmorpholine monomer units comprise about 5% to about 35% of a total number of monomer units of the side-chain polymer;
the acrylic acid monomer units comprise about 10% to about 40% of a total number of monomer units of the side-chain polymer; and
the 2-acrylamido-2-methylpropane sulfonic acid monomer units comprise about 20% to about 75% of a total number of monomer units of the side-chain polymer.

28. The method of claim 27, comprising mixing a drilling fluid comprising water with, in any order, the cement, the copolymer, and the graft copolymer.

* * * * *